Oct. 22, 1935.                J. W. ALLEN                2,018,108
                          ELECTRICAL APPARATUS
                          Filed Oct. 22, 1934
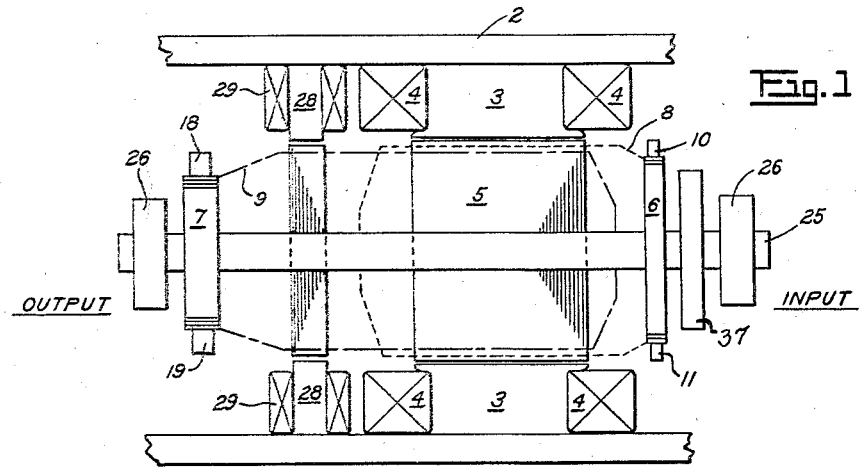
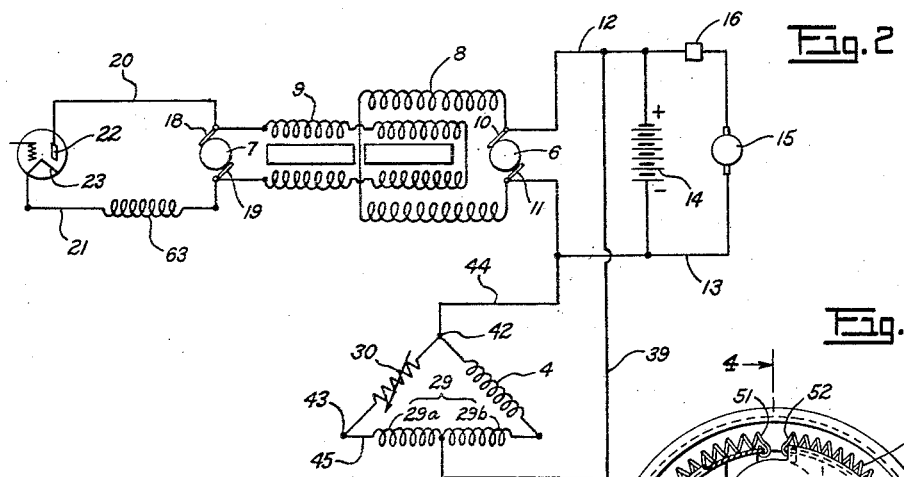
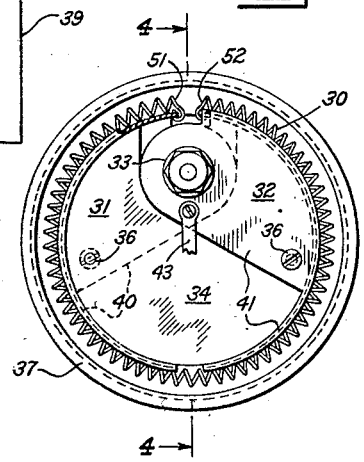
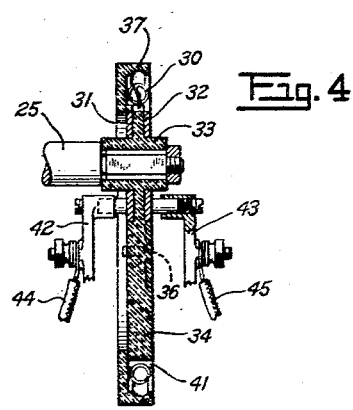
INVENTOR.
Joseph W. Allen
BY
ATTORNEY.

Patented Oct. 22, 1935

2,018,108

UNITED STATES PATENT OFFICE 2,018,108

ELECTRICAL APPARATUS

Joseph W. Allen, East Orange, N. J., assignor to Eclipse Aviation Corporation, East Orange, N. J., a corporation of New Jersey Application October 22, 1934, Serial No. 749,469

4 Claims. (Cl. 171—223)

This invention relates to dynamo electric machines, and more particularly to machines having a plurality of field coil structures, each having a distinct winding.

One of the objects of the present invention is to provide a novel dynamo electric machine of the dynamotor or motor-generator type, capable of maintaining a substantially constant potential across the output terminals, even though the current input is subject to voltage variations.

In my copending application, Serial No. 662,805 filed March 25, 1933, there is disclosed and claimed a dynamo electric machine having a plurality of windings for the receipt and delivery of current respectively, in which at least one of the windings is subject to the influence of an auxiliary field of automatically variable strength, so that it functions to "boost" the voltage across one portion of said winding when the voltage across one or more of the other portions thereof drops, and also functions to lower the voltage across said first portion when the voltage across one or more of the other portions is raised, the net result being the maintenance of a substantially constant voltage output notwithstanding variations in the voltage supplied to the current receiving terminals of the machine.

In the present invention, the same ultimate result is achieved but by employing a different method of interconnecting the field coil windings. In lieu of the Wheatstone bridge relationship shown in the copending application above referred to, the present invention contemplates a different type of multi-lateral net-work wherein one arm, or link, of the net-work consists of a resistance unit operable in response to variations in the speed of rotation of the machine to vary the number of turns of the resistance coil which are included in the net-work, the interrelation between the said resistance coil and the field windings of the machine being such as to tend to maintain a substantially constant voltage output regardless of variations in the voltage input—in other words, the same objective as in the prior copending application above identified.

In the preferred embodiment of the invention as disclosed herein, the machine to which the invention is applied is similar to that illustrated in the above identified copending application and consists of a dynamotor having two armatures and two field windings, one being the main winding and one the auxiliary in each case, and one of the armature windings being connected with a commutator adapted to receive electrical energy from an external source, such as a battery or separate generator.

Although not confined to such a use (as above pointed out) the invention finds an important field of utility as a dynamotor unit operated from a separate source of electrical energy, as for example, a generator-storage battery combination. In such an installation the present invention provides means whereby a constant voltage output is maintained throughout the entire cycle, beginning with the period when the voltage input is a minimum, as for example when the battery is not being charged by the generator, and continuing through the period while the generator is charging the battery, at which time the voltage input is a maximum. Such a system is indicated in the accompanying drawing constituting a diagrammatic illustration of the invention, although not designed as a definition of the limits thereof.

In the drawing,

Fig. 1 is a view in outline showing the invention applied to a motor generator or dynamotor.

Fig. 2 is a diagram of the electric circuits involved.

Fig. 3 is an elevation view of a suitable speed responsive resistance control device; and Fig. 4 is a sectional view along line 4—4 of Fig. 3.

Referring to the drawing, reference character 2 represents the frame of a machine upon which are mounted main field pole pieces 3 disposed in the conventional manner on the interior of the frame. Coils 4 of the proper number of turns are so wound on the pole pieces 3 as to provide the conventional north and south poles. Within and extending through pole pieces 3 is a rotor 5 having a commutator 6 at one end and a commutator 7 at the other. A current receiving armature winding 8 of the proper number of turns is wound in slots on rotor 5 and the ends of the winding are connected with the commutator 6. A second, and preferably high voltage armature winding 9 is also wound on the rotor 5, and may occupy the same slots as those of the winding 8 or adjacent slots. The ends of the winding 9 are connected with the commutator 7, and the turns of the winding 8 extend only to the limit of the range of the main field flux created by the coils 4; while the winding 9 on the other hand extends beyond the range of the main field flux and within an auxiliary field as hereinafter described.

Brushes 10 and 11 are provided for distributing the current fed to the receiving winding 8, and by means of leads 12 and 13 are connected with a battery 14 and a generator 15 which charges said battery through connections which preferably include a conventional reverse current cut-out 16. Brushes 18 and 19 are provided for collecting current from the commutator 7 and supplying the same by means of leads 20 and 21 to a constant current consuming device, such as a plate 22 adapted to receive an electronic charge from the filament 23 of a radio tube.

The armature shaft 25, locked to the armature rotor 5 in any well-known manner, forming no part of the present invention, is preferably mounted in bearings 26 constituting part of the frame assembly 2.

As above suggested, the present invention provides means additional to the main field winding 4, and electrically connected thereto in a novel manner, for automatically varying the inductive effect of the current flowing through the machine in accordance with variations in the voltage across the input terminals 10 and 11. As shown, such means includes pole pieces 28 mounted on the interior of frame 2 in angular positions corresponding to the positions of the main pole pieces 3, but axially spaced with respect thereto as indicated in Fig. 1. On the pole pieces 28 are two windings 29a and 29b, the former being wound in a direction corresponding to that of the field coils 4, and the latter being wound in the opposite direction, so as to "buck" the magnetizing effect of the former. As shown in Fig. 1, the axial spacing of the auxiliary pole pieces 28 is such that they coact magnetically with the left-hand portion only of the conductors constituting the current delivering winding 9, but have no electro-magnetic effect upon any portion of the current receiving winding 8, as the turns of the latter winding terminate short of the inductive range of this auxiliary field. It is evident, therefore, that the electro-motive effect developed in the left-hand sections of the winding 9 will either assist or oppose the E. M. F. developed in the right-hand portions thereof (subjected to the influence of the main field 3) depending upon whether the net effect of the opposing currents in the two sections 29a and 29b of the auxiliary field winding 29 is to assist or oppose the action of the field 4. It is also evident that it is desirable to have the E. M. F. developed in the left-hand portions of the windings assist that developed in the right-hand portions on any occasion when the input voltage drops below the mean voltage input, as for example, during the period when the generator 15 is not working and the battery 14 is discharging. It will also be evident that it is desirable to reverse this condition automatically as soon as the generator charges the battery 14 sufficiently to produce a resultant rise in the voltage across the input terminals 10 and 11. In this invention I effect this automatic change in the value and direction of the E. M. F. by the use of a variable resistance 30 in series with winding 29a as shown schematically in Fig. 2; the winding 29b being in series with field winding 4 and the whole constituting a four link network shunted across the input lines by means of shunt connections 39 and 44, so arranged that the net compensating effect of the links 29a and 29b depends upon the number of effective turns in the variable resistance 30, and this in turn depends upon the speed of rotation, as will be seen upon examination of Figs. 3 and 4.

Referring to Figs. 3 and 4, the resistance 30 is shown as mounted to rotate with a pair of segments 40 and 41 corresponding in structure and function to the segments 12 and 13 in my Patent No. 1,943,781 granted January 16, 1934. Each segment has an outer rim of length corresponding to an arc of preferably slightly less than 180 degrees, and each is provided with a projecting face or ear, as indicated at 31 and 32, said ears being apertured to permit registry with the hub 33 of the insulating member 34, and the curvature of the elements being such as to register with the outer cylindrical surface of the member 34. Moreover, the outer cylindrical surface of the member 34 is preferably cut away on opposite faces, to permit assembly of the arcate members 40 and 41 thereon in such manner as to bring the faces of the latter flush with the opposite faces of the member 34, as indicated in Fig. 4. Members 40 and 41 may be secured to member 34 by any suitable means, such as machine screws 36.

Resistance coil 30 has its ends 51 and 52 extending into a recess in member 34, and the remainder is shown as in contact with concave grooves or tracks in the arcuate surface of the elements 40 and 41. The coil 30 is retained in place, although permitted a proper degree of expansion radially, by the provision of a suitable enclosing portion 37 of member 34. The portion 37 is preferably in the form of an annular plate or ledge having an inwardly turned circular rim, on the inner surface of which is provided a concave groove or track adapted to limit the radial movement of the coil 30.

As shown, hub 33 is keyed to the shaft 25 of the dynamotor at a point preferably between the commutator 9 and the bearing 26, and the tension in the spring coil 30 is preferably such as to insure its remaining in contact with the grooves 40 and 41 for its entire length only at the lowest speed of the unit, corresponding to the lowest voltage input to the windings 8. Brushes engage the faces 31 and 32, and are mounted in supports 42 and 43 respectively, to which are connected leads 44 and 45, the latter being an extension of the winding 29a, as shown in Fig. 2.

As the generator accelerates, the fact that coil 30, although circular in form, is rotating about a center eccentric to the axis of rotation of the generator shaft 25, will cause that portion of the resistance element which is farthest away from such axis to be forced outward and away from the short circuiting action of the arcuate segments 40 and 41 which are, of course, of much lower current resisting quality. The resistance between the terminals 42 and 43 will accordingly be increased, due to the insertion in the circuit of that portion of the spring which has moved away from contact with the tracks 40 and 41. The result is a reduction in the current which flows through the winding 29a and coil 30, and a corresponding increase in the strength of the "bucking" winding 29b, which now receives a greater proportion of the total field current. As the speed continues to increase, additional portions of the resistance element 30 will be forced away from the arcuate elements 41 and 42 and thereby produce further strengthening of the opposing action of winding 29b, such tendency continuing until, at maximum generated speed, the coil 30 will be out of contact with elements 41 and 42 for its entire length. As the speed of the generator drops, the reverse action will, of course, occur.

It will therefore be evident that the magnetizing effect of the winding 29a will fall gradually from a maximum (when for example, the input voltage is a minimum) through a medium point (at which it exactly neutralizes the "bucking" effect of 29b) to a minimum, corresponding to maximum input voltage. To express the action in terms of the field 29 as a whole: the effect is to provide a maximum assisting action at minimum input voltage, a neutralized action (neither "bucking" nor assisting) at normal input voltage, and a maximum "bucking" action at maximum input voltage.

Now inasmuch as the E. M. F. impressed upon the current being generated in the rotor winding 8 and fed to the current delivery terminals 18 and 19 of the commutator 7, is a direct function of, and corresponds to, the resultant E. M. F. (that is, the input E. M. F. increased or diminished by the compensating effect of the field 28) existing in the rotor windings 9, it follows that the compensating effect of the auxiliary field windings 29 tends to stabilize the E. M. F. not only in the input windings 8, but also in the output windings 9.

As a further refinement upon the stabilizing effect of the windings 29, the pole pieces 28 may include, if desired, an additional compensating field electrically connected in the manner indicated at 63 in Fig. 2. When so disposed it will be apparent that this additional compensating field winding 63 is in the nature of a series field winding in its relation to the output winding 9, and therefore the flux produced by this series field 63 will be proportional to the current taken from the output terminals 18 and 19. Now inasmuch as an increase of current taken from the terminals 18 and 19 causes a corresponding increase in the current flow through the input winding 8, it follows that a voltage drop will occur in both these windings in response to such an increase in current. This voltage drop will be offset by the boosting effect of coil 63 upon the left-hand portion of the windings 9, and the resulting boost in potential windings 8 will compensate for the drop in voltage caused by the current increase above described.

It will be obvious that the invention is not limited to the specific form described and illustrated in the drawing, but is capable of a variety of electro-mechanical embodiments. Various changes which will now appear to those skilled in the art may be made in the form, details of construction, and arrangement of the parts, without departing from the spirit of the invention, as expressed in the broadest of the appended claims.

What is claimed is:

1. In combination with a dynamo electric machine having a current receiving armature winding and a current generating armature winding, a plurality of sets of field pole pieces within the induction range of said current receiving armature winding, a corresponding plurality of field windings, one for each of said sets of field pole pieces, and means for causing opposing currents to flow through one of said field windings so that the voltage across that portion of the current receiving armature winding which is within the induction range of one of said field windings tends to supplement or oppose the E. M. F. in the remaining portion of said current receiving armature winding in accordance with whether the latter is above or below a predetermined value, whereby the current generated in the second named armature winding is maintained at substantially constant potential regardless of variations in voltage across said first named armature winding.

2. In combination with a dynamo electric machine having an armature winding, a plurality of axially spaced sets of field pole pieces within the induction range of said armature winding, a corresponding plurality of field windings, one for each of said sets of field pole pieces, and means for causing opposing currents to flow through one of said field windings so that the voltage across that portion of the armature winding which is within the induction range of one of said field windings tends to supplement or oppose the E. M. F. in the remaining portion of said armature winding, in accordance with whether the latter is above or below a predetermined value.

3. In combination with a dynamo electric machine having a current receiving armature winding and a current generating armature winding, a plurality of sets of field pole pieces within the induction range of said current receiving armature winding, a corresponding plurality of field windings, one for each of said sets of field pole pieces, and means for electrically connecting said field windings so that one is divided to form two adjacent links of a multi-link network and the other constitutes an additional link of said network, and means for varying the amount of current flow in the second named field winding, said means constituting a fourth link in the network.

4. In combination with a dynamo electric machine having a current receiving armature winding and a current generating armature winding, a plurality of sets of field pole pieces within the induction range of said current receiving armature winding, a corresponding plurality of field windings, one for each of said sets of field pole pieces, and means for electrically connecting said field windings so that one is divided to form two adjacent links of a multi-link network and the other constitutes an additional link of said network, and speed responsive means for varying the amount of current flow in the second named field winding, said means constituting a fourth link in the network.

JOSEPH W. ALLEN.